(12) United States Patent
Brooks et al.

(10) Patent No.: US 8,498,222 B2
(45) Date of Patent: Jul. 30, 2013

(54) VOIP-BASED INVOCATION OF PSTN-BASED AIN/IN SERVICES

(75) Inventors: Euclid S. Brooks, Laurel, MD (US); Jeffrey R. Evans, Lovettsville, VA (US); Nashwa F. Sidhom, Edison, NJ (US); Henry L. Tam, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1510 days.

(21) Appl. No.: 12/101,415

(22) Filed: Apr. 11, 2008

(65) Prior Publication Data

US 2009/0257428 A1    Oct. 15, 2009

(51) Int. Cl.
*H04L 12/28* (2006.01)

(52) U.S. Cl.
USPC ...... 370/254; 370/395.2; 370/401; 455/456.1

(58) Field of Classification Search
None
See application file for complete search history.

(56) References Cited

U.S. PATENT DOCUMENTS

| | | | |
|---|---|---|---|
| 5,878,126 A * | 3/1999 | Velamuri et al. | 379/219 |
| 6,185,204 B1 * | 2/2001 | Voit | 370/352 |
| 6,240,449 B1 * | 5/2001 | Nadeau | 709/223 |
| 6,636,596 B1 * | 10/2003 | Gallant et al. | 379/220.01 |
| 6,661,785 B1 * | 12/2003 | Zhang et al. | 370/352 |
| 6,791,971 B1 * | 9/2004 | Osman et al. | 370/352 |
| 6,865,266 B1 * | 3/2005 | Pershan | 379/221.13 |
| 7,023,837 B1 * | 4/2006 | Srinivasan | 370/352 |
| 7,046,658 B1 * | 5/2006 | Kundaje et al. | 370/352 |
| 7,873,029 B2 * | 1/2011 | Chang et al. | 370/352 |
| 2005/0190721 A1 * | 9/2005 | Pershan | 370/328 |
| 2005/0213716 A1 * | 9/2005 | Zhu et al. | 379/45 |
| 2006/0025140 A1 * | 2/2006 | Bales et al. | 455/445 |
| 2006/0209791 A1 * | 9/2006 | Khadri et al. | 370/352 |
| 2006/0280165 A1 * | 12/2006 | Blumenschein et al. | 370/352 |
| 2009/0027191 A1 * | 1/2009 | Farah et al. | 340/539.13 |

* cited by examiner

*Primary Examiner* — Gregory Sefcheck
*Assistant Examiner* — Daniel Mitchell

(57) ABSTRACT

A method may include receiving an Advanced Intelligent Network/Intelligent Network (AIN/IN) service request from a Voice over Internet Protocol (VoIP) subscriber, generating an IP-based message for invoking the AIN/IN service based on the AIN/IN service request, routing the IP-based message to an AIN/IN service control device via an IP signaling gateway, receiving an AIN/IN response from the AIN/IN service control device based on the IP-based message, and connecting the VoIP subscriber to the AIN/IN service based on the AIN/IN response.

20 Claims, 10 Drawing Sheets

VOIP-BASED INVOCATION OF PSTN-BASED AIN/IN SERVICES

BACKGROUND

Voice-over Internet Protocol (VoIP) networks provide subscribers with some advantages over other types of networks, such as Public Switch Telephone Networks (PSTN). For example, unlike a PSTN subscriber, a VoIP subscriber may register their telephone number(s) at different locations and/or have a non-local telephone number(s) in addition to their regular local number(s) with a VoIP connection.

In a PSTN, there are Advanced Intelligent Network (AIN)/Intelligent Network (IN) services (e.g., selective routing, call allocator, alternate destination on busy (ADOB), call gate, etc.) available to a subscriber. Some of the AIN/IN services are geographically oriented services that may be provided to a subscriber based on special numbers that can be dialed. The special number can include N11 codes that provide special services. For example, a subscriber may dial an N11 code, such as, (211) for community services, (311) for non-emergency, governmental services, (411) for directory assistance, (511) for traffic information or police non-emergency services, etc. Alternatively, the special number may correspond to a 10-digit telephone number that provides a special service. For example, (301)-555-PIZZA may be a centralized number for a nationally known pizza delivery company. As telephone service providers (TSPs) transition toward VoIP networks, it would be beneficial to leverage their existing equipment and software investments to provide these same services to VoIP subscribers. However, providing these services to a VoIP subscriber can be problematic. For example, if a VoIP network sends a request for these services to a PSTN, inefficient routing and problems identifying the VoIP subscriber's physical location may occur.

DETAILED DESCRIPTION OF PREFERRED EMBODIMENTS

The following detailed description refers to the accompanying drawings. The same reference numbers in different drawings may identify the same or similar elements. Also, the following description does not limit the invention.

The term "may" is used throughout this application and is intended to be interpreted, for example, as "having the potential to," "configured to," or "being able to", and not in a mandatory sense (e.g., as "must"). The term "component," is intended to be broadly interpreted to include software, hardware, or a combination of hardware and software. The terms "a", "an" and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

Although the Session Initiation Protocol (SIP) or the Hypertext Transfer Protocol (HTTP) may be discussed in reference to implementations associated with the concepts described herein, other IP signaling protocols (e.g., H.323, etc.) may be employed. Accordingly, the concepts described herein are not dependent on employing particular protocols (e.g., HTTP and SIP), but may be adapted to other protocols not specifically described herein.

Figure 1:
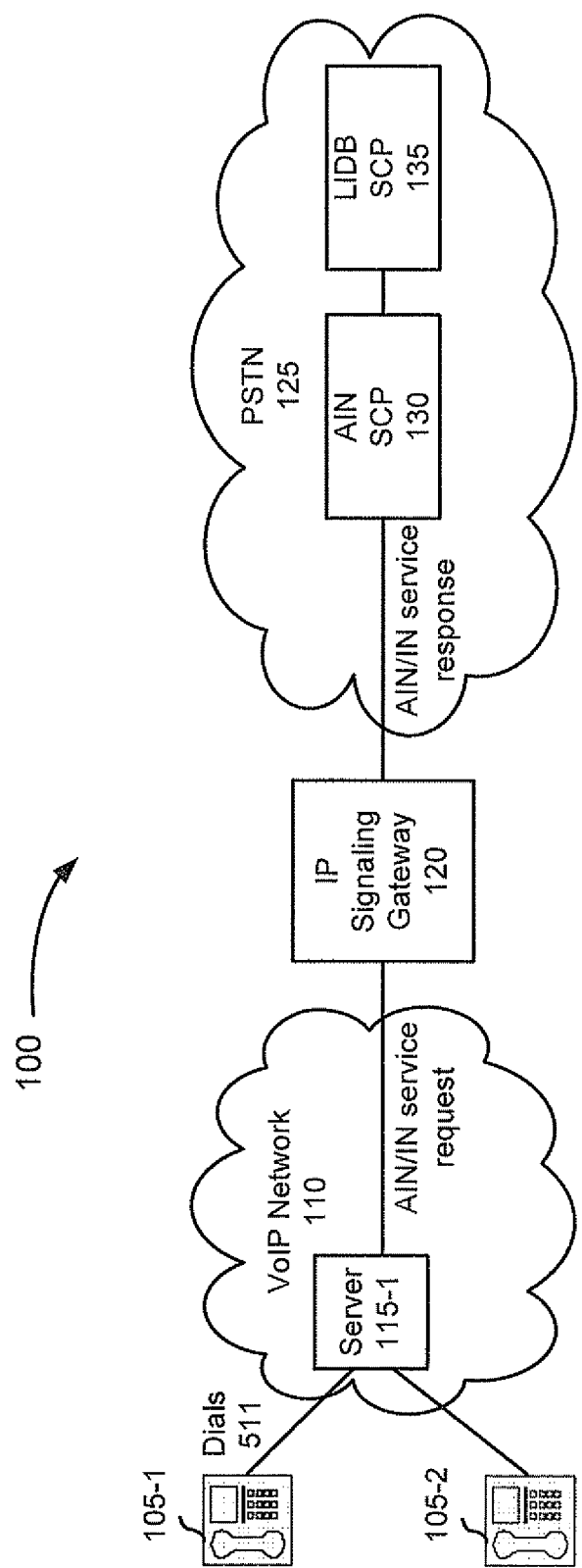
FIG. 1 is a diagram illustrating concepts described herein.

Implementations described herein provide AIN/IN services to a VoIP subscriber. FIG. 1 is a diagram illustrating an exemplary environment 100. As illustrated, exemplary environment 100 may include terminals 105-1 and 105-2, a VoIP network 110, a server 115-1, an IP signaling gateway 120, and a PSTN 125 that includes an Advanced Intelligent Network (AIN) Service Control Point (SCP) 130, and a Line Information Database (LIDB) SCP 135.

Each of terminals 105-1 and 105-2 may include a user device having communication capability. For example, terminals 105-1 and 105-3 may include an IP-telephone, a computer (e.g., a personal computer, a laptop, a personal digital assistant (PDA)) with VoIP software and peripherals (e.g., a microphone and a speaker), a Plain Old Telephone (POT) with a VoIP adapter, etc. VoIP network 110 may include an IP-based network that supports, among other things, IP telephony.

Server 115-1 may include a computational device capable of communicating with various network elements of VoIP network 110 (e.g., softswitches, routers, gateways, integrated access devices (IADs), etc., (not illustrated)), endpoints (e.g., terminal 105-1 and terminal 105-2), and/or network elements of PSTN 125 (e.g., AIN SCP 130, etc.). Server 115-1 may include, among other things, a component to manage (e.g., screen, route, transfer, etc.) a VoIP call. In one implementation, server 115-1 may include an application server.

IP signaling gateway 120 may include a device that provides an IP interface (e.g., to VoIP network 110) and a legacy telephone interface (e.g., to PSTN 125) to communicatively couple different network types. For example, IP signaling gateway 120 may enable VoIP network-based queries to be communicated to AIN/IN SCP, such as AIN SCP 130, and/or access databases (e.g., a LIDB, a toll-free database, etc.) in PSTN 125. IP signaling gateway 120 may be configured to perform protocol conversions. For example, IP signaling gateway 120 may convert an IP-based protocol (e.g., SIP, HTTP, etc.) to a native protocol of AIN SCP 130. In some instances, the native protocol of AIN SCP 130 may include an IP protocol. Additionally, or alternatively, IP signaling gateway 120 may provide customized protocol conversions to accommodate specific or general AIN/IN service requirements. PSTN 125 may include a circuit-switched telephone network.

AIN SCP 130 may include a device that includes a component (e.g., a service logic program (SLP)) that controls call processing and provides AIN/IN services. In some instances, AIN SCP 130 may include an IP interface. In other instances, AIN SCP 130 may not include an IP interface and may communicate with external devices employing system specific or proprietary protocols. AIN SCP 130 may forward AIN/IN service queries to LIDB SCP 135 and return instructions to IP signaling gateway 120 based on data stored in LIDB SCP 135. In other implementations, AIN SCP 130 may include a database for servicing AIN/IN service queries.

LIDB SCP 135 may include a device that stores a database that contains, for example, subscriber information, such as 10-digit telephone numbers, location addresses (e.g., a Zone Improvement Plan (zip) code), service provider identifiers, equipment types (payphone, POTs, IP telephone, etc.), calling card information, bill number screening information, service restrictions, class of service etc. LIDB SCP 135 may be communicatively coupled to AIN SCP 130 based on a Common Channel Signaling (CCS) Signaling System 7 (SS7) link.

For purposes of discussion, assume that a VoIP subscriber (not illustrated) places a call (e.g., by dialing (511)) from terminal 105-1 to reach terminal 105-2. Terminal 105-2 may be associated with a traffic information service. The call may be received by server 115-1. Server 115-1 may generate an AIN/IN service request and communicate it to IP signaling gateway 120. The AIN/IN service request may be communicated employing an IP transport protocol (e.g., SIP, HTTP, etc.). The AIN/IN service request may include a (511) service request and the telephone number corresponding to terminal 105-1. The AIN/IN service request may be communicated to AIN SCP 130 by IP signaling gateway 120. AIN SCP 130 may consult LIDB SCP 135 and provide an AIN/IN service response to IP signaling gateway 120. The AIN/IN service response may include, for example, a routing number (e.g., the telephone number of terminal 105-2). IP signaling gateway 120 may translate the AIN/IN service response to an IP protocol and then forward the AIN/IN service response to server 115-1. Server 115-1 may route the call to terminal 105-2 based on the AIN/IN service response.

As a result of the foregoing, environment 100 may enable AIN/IN services to be delivered to a VoIP subscriber in an efficient manner. For example, in other, traditional, implementations, when a VoIP subscriber invokes an AIN/IN service, PSTN resources (e.g., service switching points) and/or other resources (e.g., media gateways) may be utilized for the entire length of the call. In this regard, such an approach unnecessarily wastes resources, particularly if both endpoints reside on the same VoIP network. Additionally, in contrast to traditional implementations, calls may be routed more efficiently. Further, the cost of adding AIN/IN capabilities to a VoIP network may be obviated by utilizing existing AIN/IN services in a PSTN.

Since environment 100 has been partially described, variations to the above concepts will be discussed further below. Additionally, the N11 code (i.e., (511)) is an exemplary AIN/IN service applicable to the concepts described herein; however, other types of AIN/IN services may be considered, as will be described further below.

Although FIG. 1 illustrates an exemplary environment 100, in other implementations, environment 100 may include fewer, additional, or different devices than those illustrated in FIG. 1. Additionally, or alternatively, in other implementations, devices may be combined into a single device. Additionally, or alternatively a device may be implemented as two or more devices. Additionally, or alternatively, in other implementations, environment 100 may include a different arrangement and/or configuration than the arrangement and configuration depicted in FIG. 1. Additionally, or alternatively, it will be appreciated that one or more devices in FIG. 1 may perform the functions of one or more other devices depicted in FIG. 1. Additionally, or alternatively, it will be appreciated that connections in FIG. 1 may be direct or indirect, as well as wired or wireless.

Figure 2:
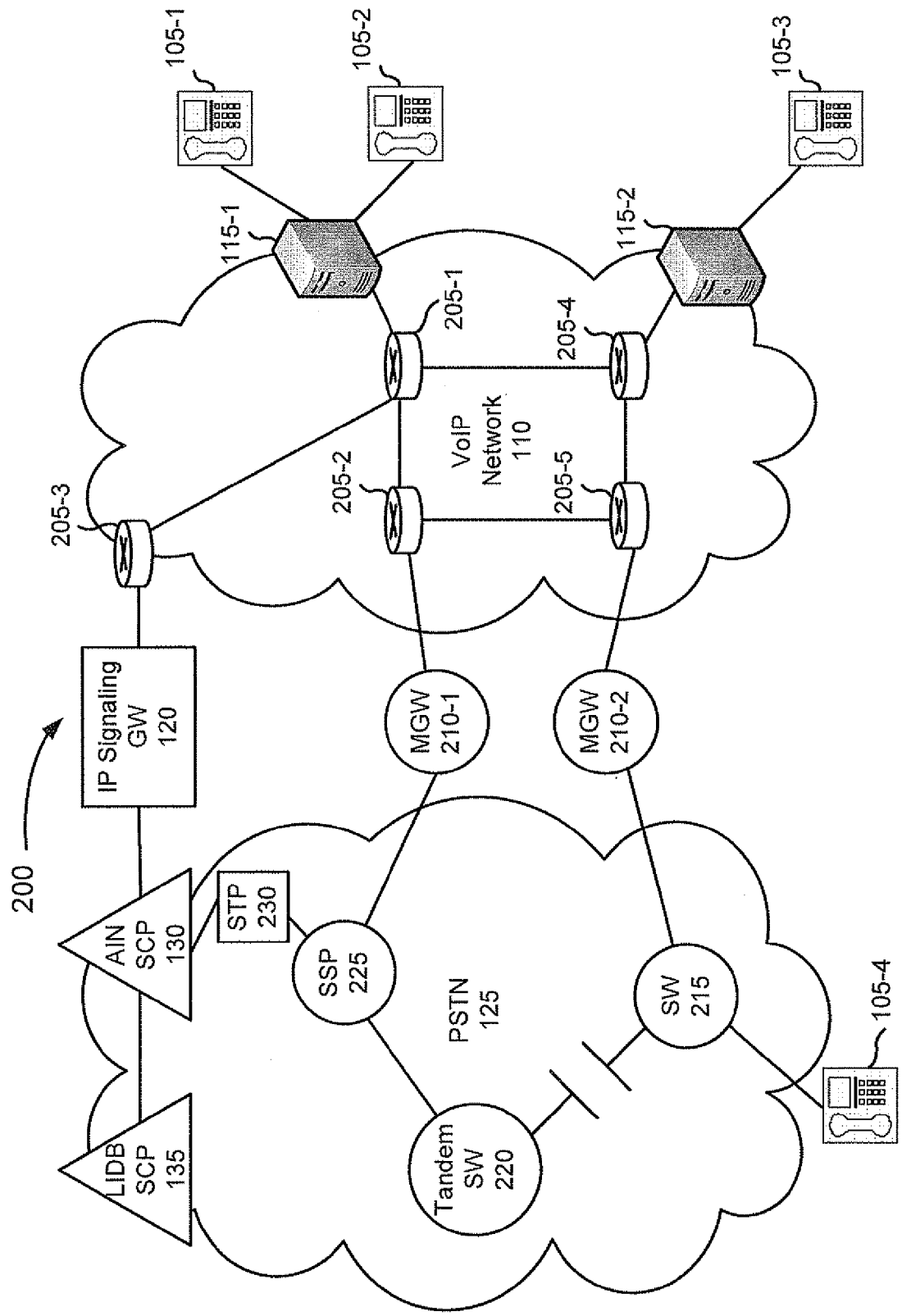
FIG. 2 is a diagram illustrating an exemplary environment in which systems and methods described herein may be implemented.

FIG. 2 is a diagram illustrating an exemplary environment 200. Environment 200 may include devices previously described in connection with environment 100. As illustrated, environment 200 may include, in addition to the devices previously described in connection with FIG. 1, terminals 105-3, 105-4, server 115-2, routers 205-1, 205-2, 205-3, 205-4, and 205-5 (collectively referred to as routers 205), media gateways (MGWs) 210-1 and 210-2 (collectively referred to as MGWs 210), a switch (SW) 215, a tandem switch (SW) 220, a service switching point (SSP) 225, and a service transfer point (STP) 230.

Terminals 105-3, 105-4 and server 115-2 may correspond to devices previously described in connection with terminals 105-1, 105-2 and server 115-1, respectively. Terminals 105-1, 105-2, 105-3, 105-4 may be referred to collectively as terminals 105. Similarly, servers 115-1 and 115-2 may be referred to collectively as servers 115.

Routers 205 may include a device that routes IP traffic within VoIP network 110. MGWs 210 may include a device that provides translation services (e.g., transmission, coding, etc.), call control and signaling, and/or routing between networks, such as VoIP network 110 and PSTN 125. Switch 215 may include a device that routes calls within PSTN 125. For example, switch 215 may include a class 4 switch and/or a class 5 switch. Tandem SW 220 may include a device that routes long distance calls.

SSP 225 may include a device that provides call control, trunk switching and signaling within PSTN 125. For example, SSP 225 may correspond to a central office (CO) or an end office (EO). SSP 225 may setup, manage, and release voice circuits required to complete a call via PSTN 125. SSP 225 may convert signaling from a voice switch into SS7 signaling messages. SSP 225 may also generate AIN/IN queries to obtain routing information.

STP 230 may include a device that routes signaling messages. For example, STP 230 may include a signal packet switch that routes SS7 signaling messages based on an address field in the SS7 messages. STP 230 may provide global title translation services, traffic concentration services, and/or firewall services (e.g., to screen SS7 messages).

Although, FIG. 2 illustrates exemplary environment 200, in other implementations, environment 200 may include fewer, additional, and/or different devices than the devices depicted in FIG. 2. Additionally, or alternatively, in other implementations, devices may be combined into a single device. For example, IP signaling gateway 120 and AIN SCP 130 may be combined into a single device. Additionally, or alternatively a device may be implemented as two or more devices. For example, server 115-1 may be implemented as two or more devices (e.g., a proxy server and a redirect server). Additionally, or alternatively, in other implementations, environment 200 may include a different arrangement and/or configuration than the arrangement and configuration depicted in FIG. 2. While the connections between devices in environment 200 are illustrated as being direct, in practice, any one of these connections may be indirect. Additionally, or alternatively, connections in environment 200 may be wired or wireless.

Figure 3:
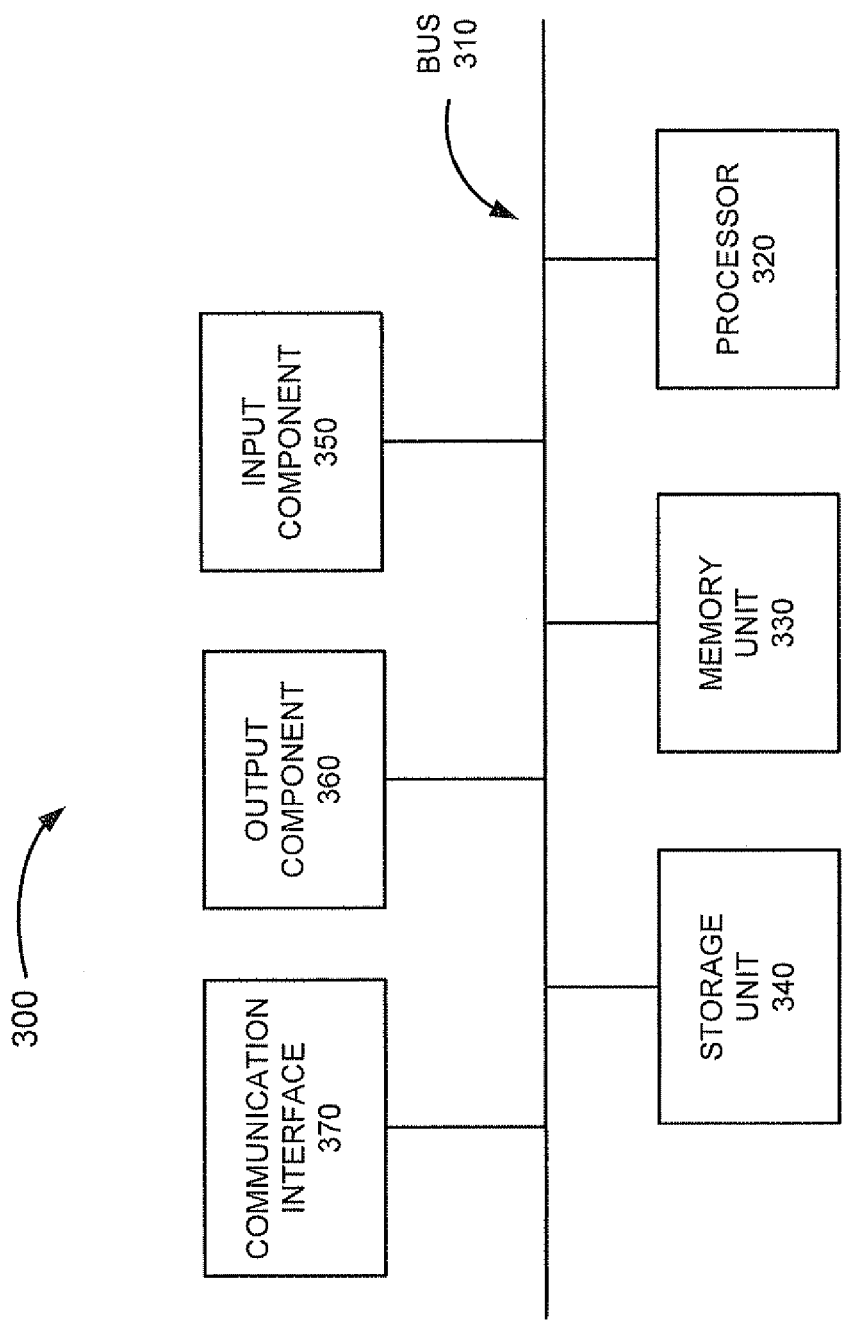
FIG. 3 is a diagram illustrating exemplary components that may correspond to one or more of the devices of the exemplary environment depicted in FIG. 2.

FIG. 3 is a diagram illustrating exemplary components of a device 300 that may correspond to one or more of the devices depicted in FIGS. 1 and 2. For example, device 300 may correspond to terminals 105, servers 115, IP signaling gateway 120, AIN SCP 130, LIDB SCP 135, routers 205, MGWs 210, SW 215, tandem SW 220, SSP 225, and/or STP 230. As illustrated, device 300 may include, among other things, a bus 310, a processor 320, a memory unit 330, a storage unit 340, an input component 350, an output component 360, and/or a communication interface 370.

Bus 310 may include a path that permits communication among the components of device 300. For example, bus 310 may include a system bus, an address bus, a data bus, and/or a control bus. Bus 310 may also include bus drivers, bus arbiters, bus interfaces, and/or clocks.

Processor 320 may include a general-purpose processor, a microprocessor, a data processor, a co-processor, a network processor, an application specific integrated circuit (ASIC), a controller, a programmable logic device, a chipset, a field programmable gate array (FPGA), or some other component that may interpret and execute instructions.

Memory unit 330 may include a device that stores data and/or instructions related to the operation and use of device 300. For example, memory unit 330 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage unit 340 may include a device that stores data, such as a hard disk (e.g., a magnetic disk, an optical disk, a magneto-optic disk, etc.), a compact disc (CD), a digital versatile disc (DVD), a floppy disk, a cartridge, a magnetic tape, another type of storage medium, or another type of computer-readable medium, along with a corresponding drive. The term "computer-readable medium" is intended to be broadly interpreted to include a physical or a logical memory device.

Memory unit 330 and/or storage unit 340 may also include a storing device external to and/or removable from device 300, such as a Universal Serial Bus (USB) memory stick, a hard disk, etc.

Input component 350 may include a mechanism that permits a user to input information to device 300, such as a keyboard, a keypad, a mouse, a button, a switch, a microphone, voice recognition logic, etc. Output component 360 may include a mechanism that outputs information to a user, such as a display, a speaker, one or more light emitting diodes (LEDs), etc.

Communication interface 370 may include any transceiver-like mechanism that enables device 300 to communicate with other devices and/or systems. For example, communication interface 370 may include an Ethernet interface, an optical interface, a coaxial interface, a radio interface, or the like.

As will be described in detail below, device 300 may perform certain operations relating to the system and methods described herein. Device 300 may perform these operations in response to processor 320 executing software instructions contained in a computer-readable medium, such as memory unit 330.

The software instructions may be read into memory unit 330 from another computer-readable medium or from another device via communication interface 370. The software instructions contained in memory unit 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 3 illustrates exemplary components of device 300, in other implementations, device 300 may include fewer, additional, and/or different components than those depicted in FIG. 3. In still other implementations, one or more components of device 300 may perform one or more other tasks described as being performed by one or more other components of device 300.

Figure 4:
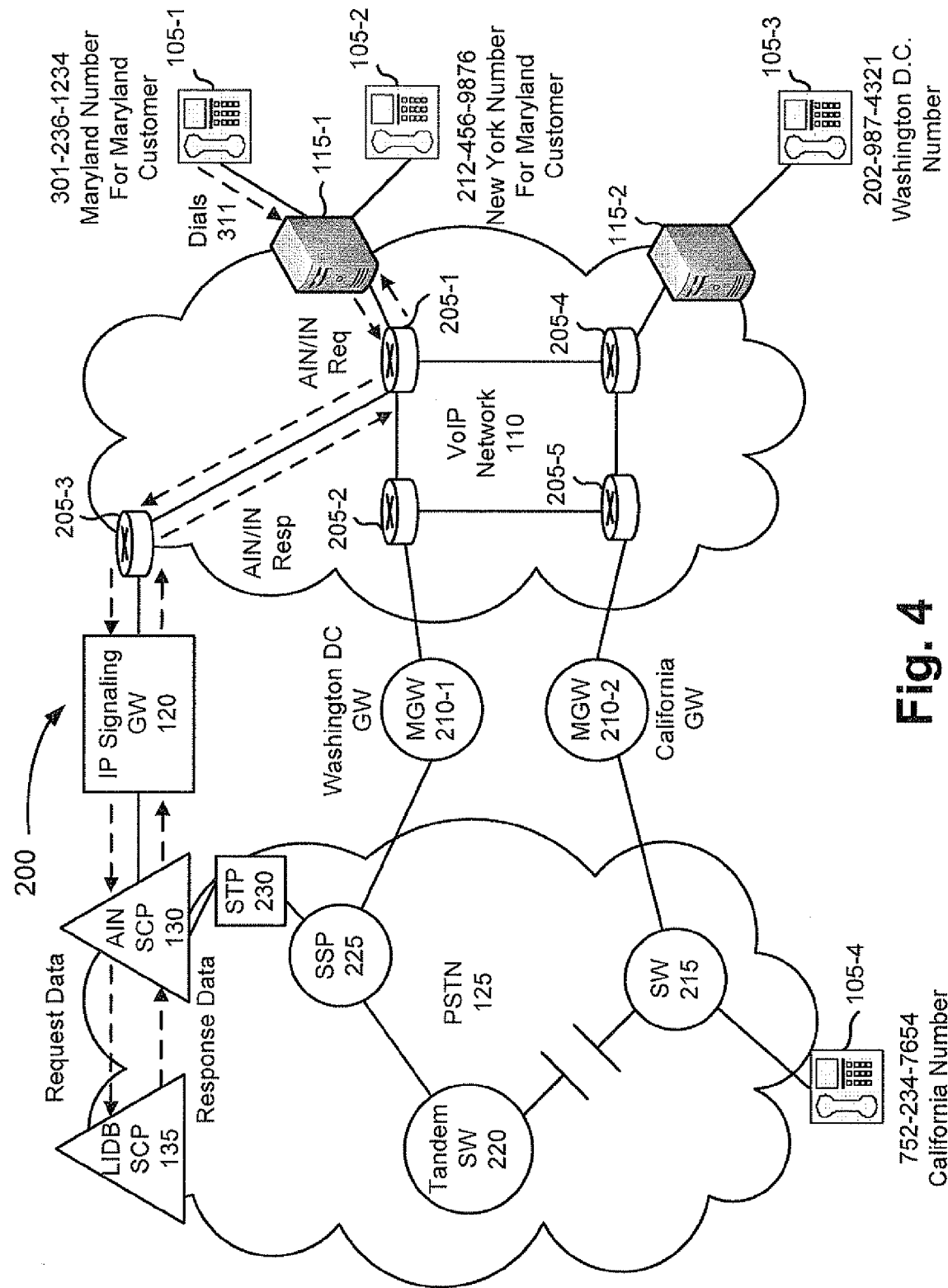
FIGS. 4 and 5 are diagrams illustrating an exemplary call scenario applicable to the concepts described herein.

FIG. 4 is a diagram illustrating an exemplary call scenario applicable to the concepts described herein. For purposes of discussion, assume a VoIP subscriber (not illustrated) lives in the Washington, D.C. area. The VoIP subscriber may have a local Maryland telephone number (e.g., 301-236-1234) and a remote New York telephone number (e.g., 212-458-9876), as illustrated in connection with terminals 105-1 and 105-2, respectively. It will be appreciated, however, that within a VoIP framework, terminal 105-1 may support both the Maryland telephone number and the New York telephone number. The VoIP subscriber may dial a N11 code (e.g., 311). The (311) code may connect callers in the Washington, D.C. area to a local center in Washington, D.C. (e.g., to terminal 105-3) that provides non-emergency, governmental services.

Server 115-1 may receive the (311) call from terminal 105-1 and recognize an invocation for this AIN/IN service. Server 115-1 may generate and send an AIN/IN request to AIN SCP 130. The AIN/IN request may be in the form of any IP-based transport protocol (e.g., HTTP, SIP, etc.) capable of carrying a user-defined payload. The AIN/IN request may include information needed by AIN SCP 130 to make a favorable service decision and respond with a routing location. Below is an exemplary HTTP AIN/IN request message. The HTTP AIN/IN request may include information utilizing an Extensible Markup Language (XML) structure, such as the following:

Request Message:

```
<N11 Service>
    <N11Code> 311</N11Code>
    <CallingParty>
        <TelephoneNumber>3012361234</TelephoneNumber>
    <CallingParty>
</N11Service>.
```

In one implementation, the HTTP AIN/IN request message may be sent in the body of an HTTP POST message. The HTTP AIN/IN request message may be routed to routers 205-1 and 205-3 and forwarded to IP signaling gateway 120. Depending on AIN SCP 130 capabilities (e.g., protocols used), IP signaling gateway 120 may convert the HTTP AIN/IN request message to a protocol that AIP SCP 130 understands. AIN SCP 130 may query LIDB SCP 135 based on the HTTP AIN/IN request message or the protocol-converted AIN/IN request to get geographic location data associated with the VoIP subscriber (e.g., a zip code). The AIN SCP 130 would then base the routing decision on this geographic location data. For example, AIN SCP 130 may perform a zip code-based search to find the destination (e.g., the telephone number of terminal 105-3) associated with the (311) service.

LIDB SCP 135 may provide AIN SCP 130 with Response Data, and AIN SCP 130 may generate and send an AIN/IN response to IP signaling gateway 120 based on this response. Depending on AIN SCP 130 capabilities (e.g., protocols used), the AIN/IN response may be an HTTP AIN/IN response or some other protocol-based AIN/IN response. For example, the HTTP AIN/IN response may be in the message body of an HTTP 200 OK message (i.e., an acknowledgement message). In other instances, AIN SCP 130 may provide the AIN/IN response in a message other than an HTTP message, and IP signaling gateway 120 may convert such a message to an HTTP AIN/IN response. Below is an exemplary HTTP AIN response message. The HTTP AIN/IN response may include information utilizing an XML structure, such as the following:
Response Message:

```
<N11RoutingResponse>
    <Status>OK</Status>
    <RoutingNumber>2029874321</RoutingNumber>
</N11RoutingResponse>.
```

It will be appreciated that in other instances, other types of HTTP messages may be generated and sent by AIN SCP 130 or IP signaling gateway 120. For example, if an error occurred, the AIN/IN response may be included in an HTTP 5XX message (e.g., server not responding, etc.) or an HTTP 4XX message (client error, etc.). In this regard, HTTP messages aligned with the HTTP may be employed to indicate success or failure relating to the transport and acceptance of the AIN/IN request. Additionally, or alternatively, data, such as that contained in the <Status> field, may be included in the AIN/IN response to indicate application level success or failure.

The HTTP AIN/IN response may be forwarded to server 115-1 via routers 205-3 and 205-1. As will be described in greater detail below, server 115-1 may route the (311) call to terminal 105-3 based on the HTTP AIN/IN response.

In another implementation, when server 115-1 receives the (311) call from terminal 105-1, server 115-1 may generate and send a SIP AIN/IN request to AIN SCP 130. Similar to the HTTP AIN/IN request message described above, the SIP AIN/IN request may include information needed by AIN SCP 130 to make a favorable service decision and respond with a routing location. Below is an exemplary SIP AIN/IN request message. The SIP AIN/IN request may be included in a SIP SUBSCRIBE message, such as the following:
Request Message:
    SUBSCRIBE sip:ospg01.n11.sip2ss7.foobar.com SIP/2.0
    Via:SIP/2.0/UDP    192.111.22.333;    branch=z9hG4bK-AppServer.asln-172.25.111.22V5060-0-974342056-2109285500-1187359657806-;event=N11
    From:<sip:asln.foobar.com>;tag=2109285500-1187359657806-
    To:<sip:ospg01.n11.sip2ss7.foobar.com>
    Call-ID:BW100737806170807-1482733508@asln-.foobar.com
    Cseq:974342056 SUBSCRIBE
    Contact:<sip: 192.111.22.333>
    Accept:application/mailbox-info
    Expires:0
    Event:N11;id=2
    Max-Forwards:20
    Content-Type:application/N11-info
    Content-Length:114
    N11-code:311
    Calling-party:sip:+13012351234@sitn.foobar.com; user=phone.

The SIP AIN/IN request may be routed to routers 205-1 and 205-3 and forwarded to IP signaling gateway 120. Depending on AIN SCP 130 capabilities (e.g., protocols used), IP signaling gateway 120 may convert the SIP AIN/IN request to a protocol that AIP SCP 130 understands. AIN SCP 130 may query LIDB SCP 135 based on the SIP AIN/IN request or the protocol-converted AIN/IN request to get geographic location data associated with the VoIP subscriber (e.g., a zip code). The AIN SCP 130 would then base the routing decision on this geographic location data. For example, AIN SCP 130 may perform a zip code-based search to find the destination (e.g., the telephone number of terminal 105-3) associated with the (311) service.

LIDB SCP 135 may provide AIN SCP 130 with Response Data, and AIN SCP 130 may generate and send an AIN/IN response to IP signaling gateway 120 based on this response. Depending on AIN SCP 130 capabilities (e.g., protocols used), the AIN/IN response may be a SIP AIN/IN response or some other protocol-based AIN/IN response. For example, the SIP AIN/IN response may be in the message body of a SIP NOTIFY message. In other instances, AIN SCP 130 may provide the AIN/IN response in a message other than a SIP message, and IP signaling gateway 120 may convert such a message to a SIP AIN/IN response. Below is an exemplary SIP AIN/IN response message. The SIP AIN/IN response may be included in a SIP NOTIFY message, such as the following:
Response Message:
    NOTIFY sip:192.111.22.333 SIP/2.0
    Via: SIP/2.0/UDP
    0.0.0.0:5060;
branch=z9hG4bK1chQs9ShPDHFf.RdYH4FZA~3797822
    Max-Forwards: 70
    To:<sip:asln.foobar.com>;tag=2109285500-1187359657806-
    From:<sip.ospg01.n11.sip2ss7.foobar.com>; tag=2kp1qtbp2i0w
    Call-ID:     BW100737806170807-1482733508@asln-.foobar.com
    CSeq: 1 NOTIFY
    Content-Length: 143
    Event:N11;id=2
    Contact: sip:sas@xyzasv01
    Subscription-State: terminated
    Content-Type: application/N11-info
    Date: Fri, 17 Aug. 2007 14:07:38 GMT
    Status: OK
    RoutingNumber: 2029874321.

It will be appreciated that in other instances, other types of SIP messages may be generated and sent by AIN SCP 130 or IP signaling gateway 120. For example, if an error occurred, the AIN/IN response may be included in a SIP 5XX message (e.g., server not responding, etc.) or a SIP 4XX message (client error, etc.). In this regard, SIP messages aligned with the SIP may be employed to indicate success or failure relating to the transport and acceptance of the AIN/IN request, as well as application level success and failure.

The SIP AIN/IN response may be forwarded to server 115-1 via routers 205-3 and 205-1. As will be described in greater detail below, server 115-1 may route the (311) call to terminal 105-3 based on the SIP AIN/IN response.

Figure 5:
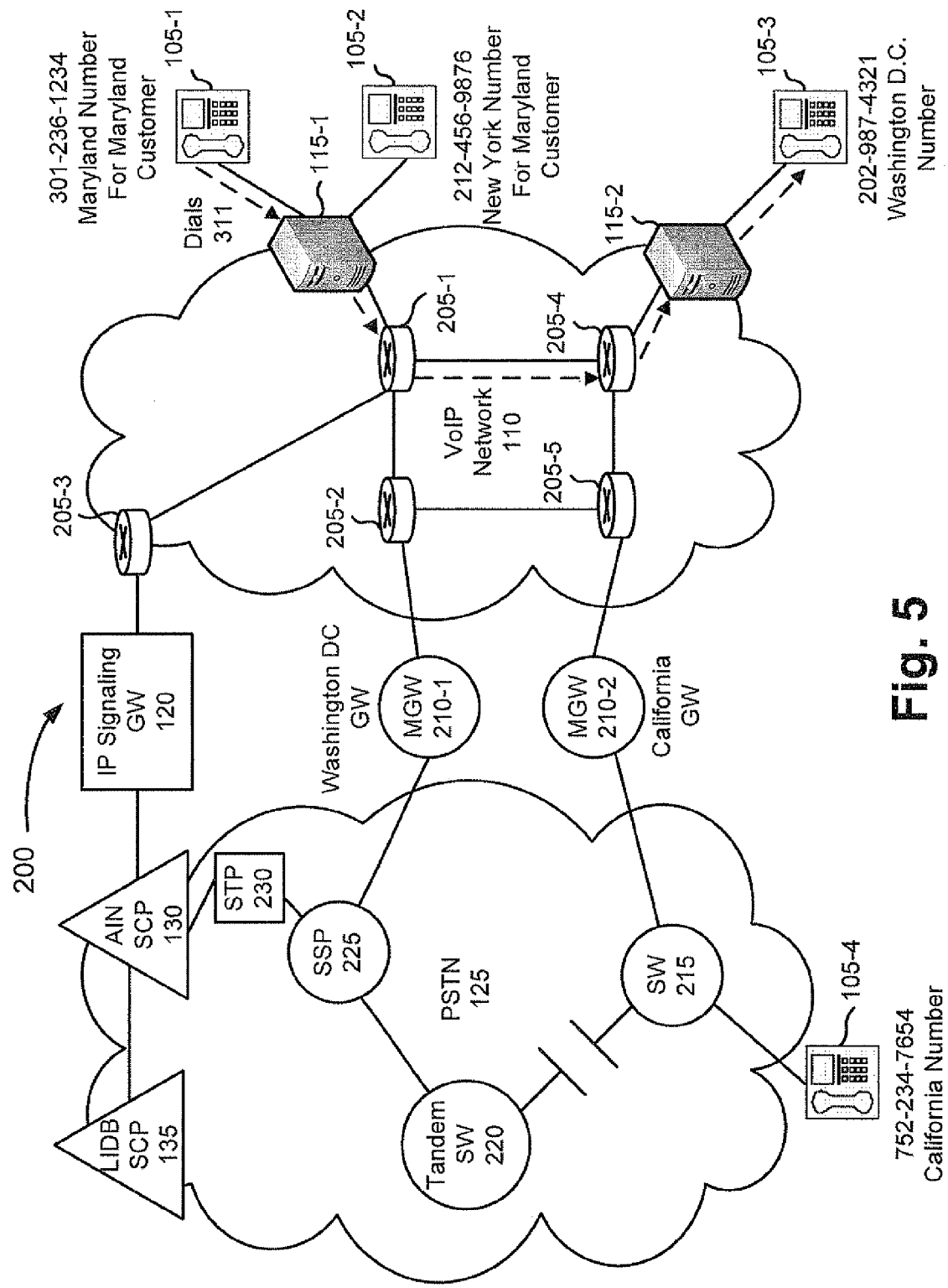

FIG. 5 is a diagram illustrating a continuation of the exemplary call scenario depicted in FIG. 4. As illustrated, when server 115-1 obtains the destination information in the AIN/IN response (e.g., an HTTP AIN/IN response or a SIP AIN/IN response, as described above), server 115-1 may connect terminal 105-1 with terminal 105-3 by routing the (311) call via routers 205-1, 205-4, and server 115-2. In this regard, the VoIP subscriber's call may be routed in the most efficient manner. That is, unlike other solutions where the (311) call may be routed through PSTN nodes even when the two endpoints reside in VoIP network 110, the (311) call may be efficiently routed completely within VoIP network 110. For example, the (311) call may be routed, among other devices, via MGW 210-1 to SSP 225 of PSTN 125. SSP 225 may provide an AIN/IN query to AIN SCP 130 via STP 230. AIN SCP 130 may obtain destination information (e.g., the telephone number of terminal 105-3) and issue an AIN/IN response to SSP 225. In such an instance, the routing rules of PSTN 125 may recognize the destination information as belonging to a VoIP subscriber and the (311) call may be routed back through MGW 210-1 and VoIP network 110 to terminal 105-3. However, in such an approach, PSTN 125 and MGW 210-1 facilities are utilized for the entire duration of the (311) call, even though both endpoints (i.e., terminal 105-1 and terminal 105-3) are on the same VoIP network 110.

As previously mentioned, a VoIP subscriber may register a telephone number at different locations. In this regard, routing decisions should be based on the VoIP subscriber's physical location, rather than the telephone number being used. In other words, the VoIP subscriber's physical location can no longer be determined based on the VoIP subscriber's telephone number and/or the location of the service provider's equipment (e.g., some routing decisions may be based on a signaling point code (SPC) of a PSTN switch launching an AIN/IN query).

Figure 6:
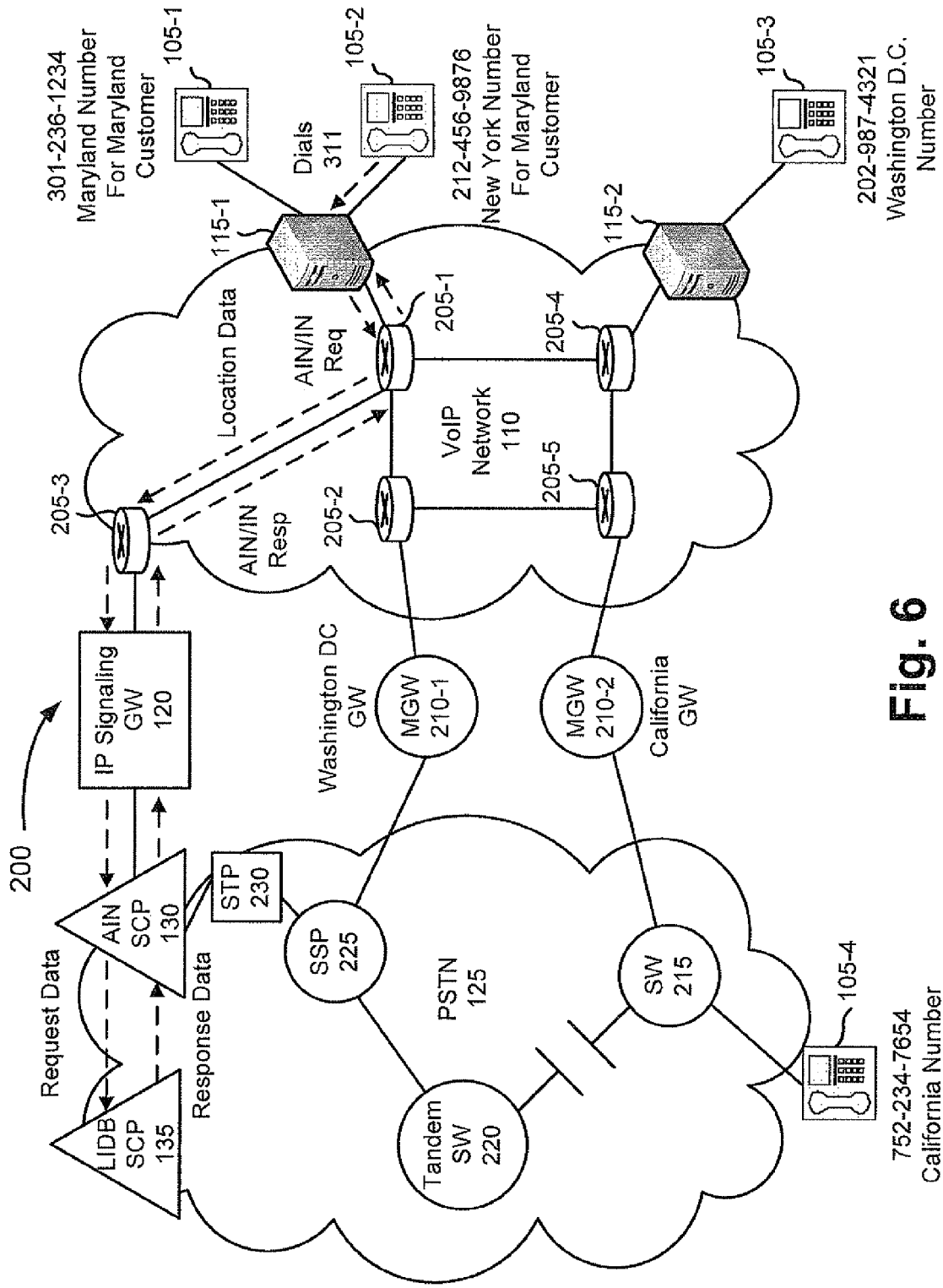
FIG. 6 is a diagram illustrating another exemplary call scenario applicable to the concepts described herein.

FIG. 6 is a diagram illustrating another exemplary call scenario applicable to the concepts described herein. As illustrated, unlike the call scenario previously described in connection with FIGS. 4 and 5, the voice subscriber may dial (311) from terminal 105-2 instead of terminal 105-1. It will be appreciated, however, that within a VoIP framework, terminal 105-1 may support both the Maryland telephone number and the New York telephone number. In such an instance, the VoIP subscriber's telephone number (e.g., the New York telephone number) does not correspond to the location of the VoIP subscriber. In other solutions, such as those employed in environment 600, the VoIP subscriber would not be able to use the (311) service calling from terminal 105-2 because PSTN 125 would rely on the relationship between the calling terminal telephone number (i.e., 212-456-9876) and the geographically oriented service (i.e., the (311) service). In other words, PSTN 125 would determine that the (311) service would not be available to a New York extension based on the traditional relationship that exists between telephone number and geographic area. However, as described below in connection with FIG. 6, the (311) service may be available to the VoIP subscriber even when dialing (311) from terminal 105-2.

In one implementation, when server 115-1 receives the (311) call request from a terminal that has a telephone number not normally associated with the geographic location of the VoIP subscriber, such as terminal 105-2, server 115-1 may add location data to the AIN/IN request. In other implementations, server 115-1 may always add the location data to the AIN/IN request regardless of whether the terminal may or may not have a telephone number normally associated with the geographic location of the VoIP subscriber (e.g., for both terminal 105-1 and terminal 105-2), thereby fully supporting location-based services.

For zip code based AIN/IN services, the VoIP subscriber's zip code, which may be provisioned in server 115-1, may be added to the AIN/IN request. In other instances, a "dummy" zip code corresponding to the geography of the AIN/IN service may be added to the AIN/IN request. Below is exemplary location data that may be added to an HTTP AIN/IN request.

The HTTP AIN/IN request may include location data utilizing the XML structure, such as the following:
<ZipCode>20910</ZipCode>.

In another implementation, the AIN/IN request may include a physical location routing number (PLRN) similar to the location routing number used to provide local number portability. For example, the PLRN may include a 10-digit telephone number or some other location identifier. In some instances, the PLRN may correspond to a "dummy" PLRN. Alternatively, other forms of location data may be included with the AIN/IN request, such as local access and transport area (LATA) identifiers, signaling point codes (SPCs), or other types of identifiers. This location data may be included with the AIN/IN request when the VoIP subscriber requests a geographic dependent service. AIN SCP 130 may make geographical decisions associated with providing an AIN/IN service based on the location data instead of based on the telephone number of the calling terminal.

It will be appreciated that devices, other than server 115-1, may provide the location data. For example, IP signaling gateway 120 may provide the location data with the AIN/IN request, convert a PLRN to a LATA, and/or perform other operations necessary to invoke the AIN/IN service.

Similar to that previously described in connection with FIG. 4, when the location data is included with the AIN/IN request, server 115-1 may obtain the destination information in the AIN/IN response, as illustrated in FIG. 6. Further, similar to that previously described in connection with FIG. 5, server 115-1 may connect terminal 105-2 with terminal 105-3 based on the AIN/IN response.

While FIG. 6 describes a particular call scenario, it will be appreciated that other situations may warrant the use of location data. For example, the location data could be (temporarily) associated with, for example, the Maryland telephone number, when the VoIP subscriber travels to another location (e.g., a location outside the jurisdiction of the service). Thus, based on these concepts, the physical location of the VoIP subscriber and/or the terminal from which the VoIP subscriber invokes a geographic based service (e.g., an AIN/IN service) becomes a non-issue.

In another implementation, LIDB SCP 135 may store location data indicating a geographic locale (e.g., state, zip code, etc.) of the VoIP subscriber, a VoIP terminal (e.g., terminals 105-1, 105-2), and/or a VoIP telephone number (e.g., the Maryland telephone number and/or the New York telephone number). For example, the location data may include the state of Maryland, a Maryland zip code, a signaling point code, a LATA, or some other locale identifier, etc. The location data may be stored in LIDB SCP 135 when a VoIP subscriber sets up a VoIP account. Additionally, or alternatively, the VoIP subscriber may change the location data when he or she moves (e.g., permanently, temporarily (e.g., while on trips), etc.). An example of this implementation is provided below.

Referring back to FIG. 6, in this exemplary call scenario, server 115-1 may send an IP message (e.g., a SIP INVITE message) to IP signaling gateway 120, indicating in a request Uniform Resource Identifier (URI) that an N11 code (e.g., 711 for telecommunication device for the deaf (TDD) service) has been invoked (e.g., from terminal 105-2). Depending on AIN SCP 130 capabilities (e.g., protocols used), IP signaling gateway 120 may convert the IP AIN/IN request (e.g., the SIP INVITE message) into an IP message or some other type of protocol-based message that will be understood by AIN SCP 130. AIN SCP 130 may query LIDB SCP 135 that may store information about telephone lines in environment 200. The information in LIDB SCP 135 may include the location data. Based on the location data from LIDB SCP 135, AIN SCP 130 may provide an AIN/IN response that includes a routing number. For example, AIN SCP 130 may send an IP AIN/IN response (e.g., a SIP 200 message)) with the routing number in the contact header. In this regard, the AIN/IN response may be based on a location of the VoIP subscriber and/or calling terminal (e.g., terminal 105-2) versus a location indicated by the calling VoIP telephone number. Below is an exemplary message flow for such a process utilizing SIP messages.

Example Message Flow:
    INVITE sip:711@172.25.112.2:5060;user=phone SIP/2.0
    Via:SIP/2.0/UDP    192.168.67.81;branch=z9hG4bK-BroadWorks.asln-172.25.112.2V5060-0-383866679-4703897
    From"FN__3012361234    LN__3012361234"<sip:+13012361234@asn.vzlab.com;    user=phone>; tag=470389714
    To:<sip:711@172.25.112.2:5060;user=phone>
    Call-ID: BW18161623718020817303 71995@asln.vzlab.com
    CSeq:383866679 INVITE
    Contact:<sip:192.168.67.81
    P-Asserted-Identity:    "FN__3012361234LN__3012361234"<sip:+13012361234@asn.vzlab.    com; user=phone>
    Privacy:non
    P-Access-Network-Info:vzt_pyoac_north
    Supported:100rel
    Allow:ACK,BYE,CANCEL,INFO,INVITE,OPTIONS, PRACK,REFER,NOTIFY
    Accept:multipart/mixed,application/media_control+xml, application/sdp
    Max-Forwards:20
    Content-Type:application/sdp
    Content-Length:220
    v=0
    o=BroadWorks 792 1 IN IP4 192.168.78.164
    S=-
    c=IN IP4 192.168.78.169
    t=0 0
    m=audio 20694 RTP/AVP 0 8 18 101
    a=rtpmap:101 telephone-event/8000
    a=rtpmap:18 G729/8000
    a=rtpmap:8 PCMA/8000
    a=rtpmap:0 PCMU/8000
    SIP/2.0 100 Trying
    Via:SIP/2.0/UDP    192.168.67.81;branch=z9hG4bK-BroadWorks.asln-172.25.112.2V5060-0-383866679-470389714
    To:<sip711@172.25.112.2:5060;user=phone>
    From:    "FN__3012361234    LN__3012361234"<sip:+13012361234@asn.vzlab.com;    user=phone>; tag=470389714
    Call-ID: BW18161623718020817303 71995@asln.vzlab.com
    CSeq:383866679 INVITE
    Content-Length: 0
    SIP/2.0 302 Moved Temporarily
    Via:SIP/2.0/UDP    192.168.67.81;branch=z9hG4bK-BroadWorks.asln-172.25.112.2V5060-0-383866679-470389714
    To:<sip:711@172.25.112.2:5060;user=phone>
    From:    "FN__3012361234    LN__3012361234"<sip:+13012361234@asn.vzlab.com;    user=phone>; tag=470389714
    Call-ID: BW18161623718008173037 1995@asln.vzlab.com
    Cseq: 383866679 INVITE
    Content-Length: 0
    Contact:<sip:+18667945678@192.168.67.90:5060; user=phone>
    Date: Mon, 18 Feb. 2008 18:16:16 GMT
    ACK sip:711@172.25.112.2:5060;user=phone SIP/2.0
    Via:SIP/2.0/UDP    192.168.67.81;branch=z9hG4bK-BroadWorks.asln-172.25.112.2V5060-0-383866679-470389714
    From:    "FN__3012361234    LN__3012361234"<sip:+13012361234@asn.vzlab.com; user=phone>;tag=47038914
    To:<sip:711@172.25.112.2:5060;user=phone>
    Call-ID: BW18161623718020817303 71995@asln.vzlab.com
    CSeq:383866679 ACK
    Max-Forwards-20
    Content-Length:0

Figure 7:
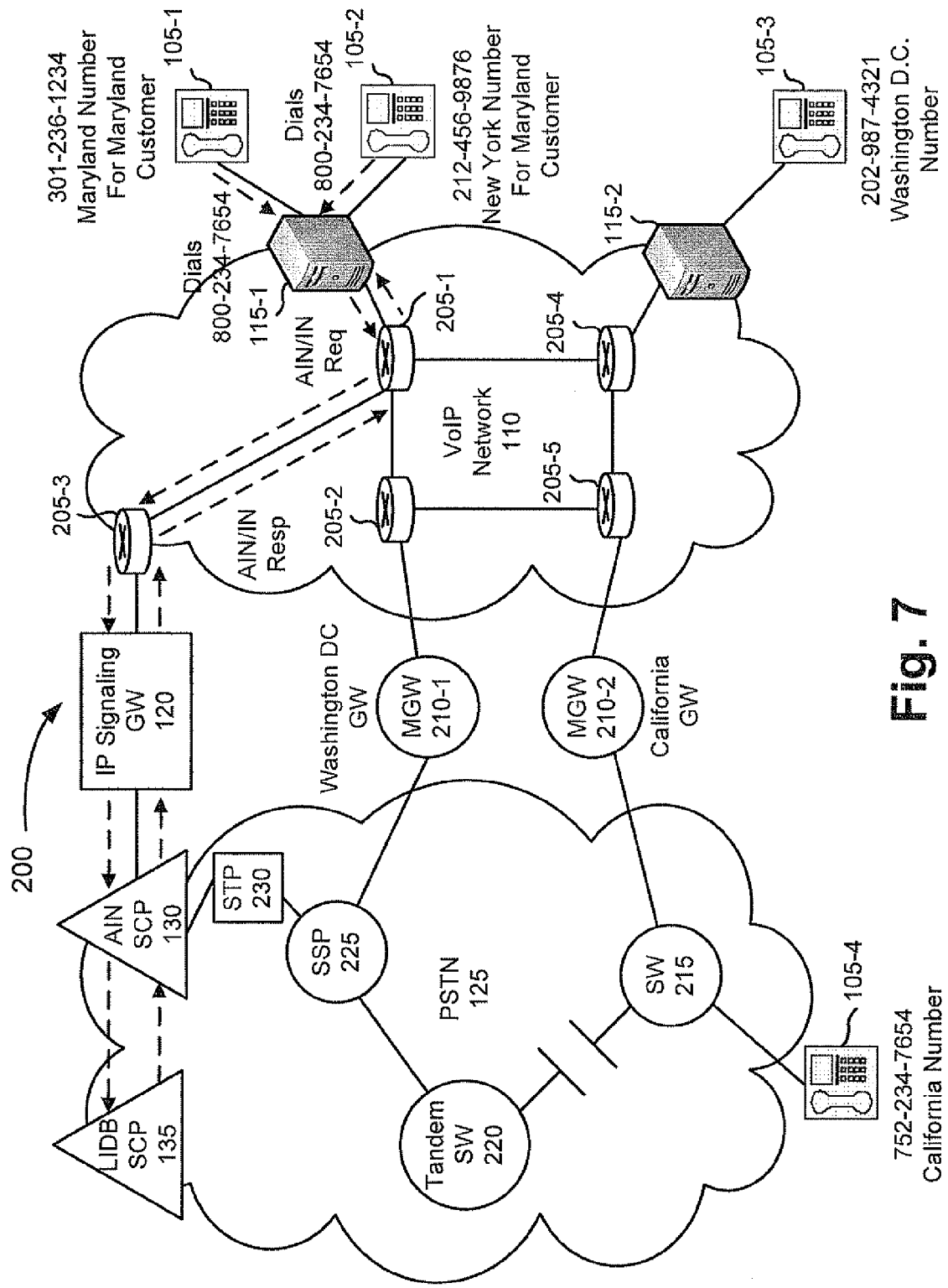
FIGS. 7 and 8 are diagrams illustrating still another exemplary call scenario applicable to the concepts described herein.
Figure 8:
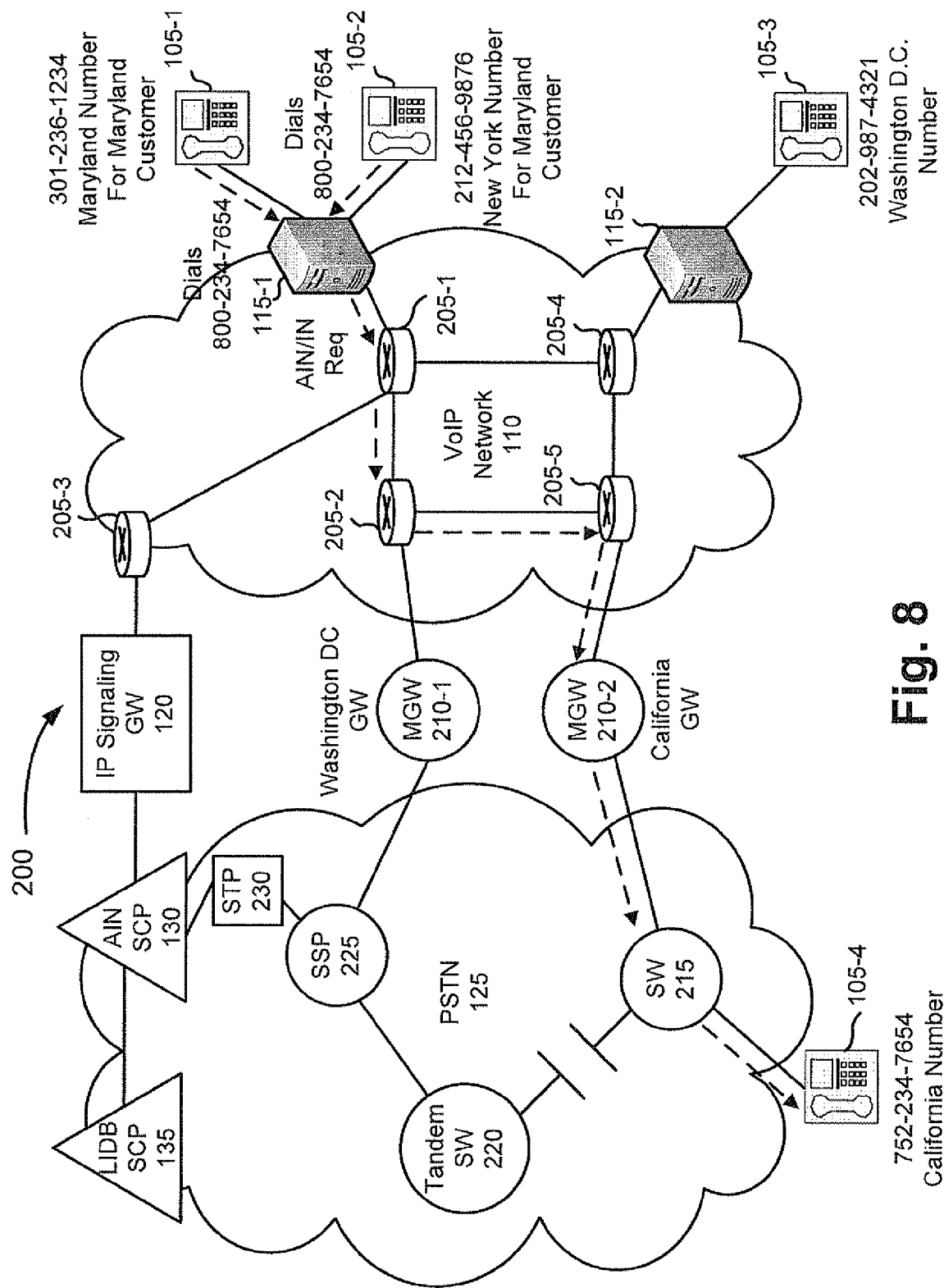

FIGS. 7 and 8 are diagrams illustrating still another call scenario involving the VoIP subscriber dialing a toll-free telephone number (e.g., an 800 telephone number). In this example, however, the VoIP subscriber may be attempting to contact a California extension (i.e., terminal 105-4) that resides in PSTN 125. Similar to that previously described, server 115-1 may receive the (800) call from terminal 105-1 or terminal 105-2, as illustrated in FIG. 7. Server 115-1 may issue an AIN/IN request to AIN SCP 130 for toll free service. The AIN/IN request may be communicated according to an IP transport protocol (e.g., HTTP, SIP, etc.). AIN SCP 130 may respond with an AIN/IN response that includes for example, the telephone number of terminal 105-4.

As illustrated in FIG. 8, server 115-1 may efficiently route the (800) call to terminal 105-4 via routers 205-2, 205-5, MGW 210-2 and SW 215. That is, unlike other solutions where the (800) call may be routed through PSTN nodes in an inefficient manner, the (800) call may be efficiently routed to terminal 105-4. For example, the (800) call may be routed, among other devices, via MGW 210-1 and SSP 225 of PSTN 125. SSP 225 may provide an AIN/IN query to AIN SCP 130 via STP 230. AIN SCP 130 may obtain destination information (e.g., the telephone number of terminal 105-4) and issue an AIN/IN response to SSP 225.

In such an instance, the routing rules of PSTN 125 may provide that the (800) call be routed through tandem SW 220 and SW 215 to ultimately reach terminal 105-4. However, in such an approach, the long distance facilities of PSTN 125 may be unnecessarily utilized for the entire duration of the (800) call. In contrast, as illustrated in FIG. 8, server 115-1 may determine the most efficient route to reach terminal 105-4 via PSTN 125. In such an instance, server 115-1 may determine that the most efficient route does not involve MGW 210-1, which is closest to terminals 105-1, 105-2, SSP 225 and/or AIN SCP 130. Rather, server 115-1 may select MGW 210-2 to route the (800) call, which is closest to the destination endpoint (e.g., terminal 105-4). In this way, the utilization of facilities of PSTN 125 are minimized and the (800) call is routed in the most efficient manner.

Figure 9:
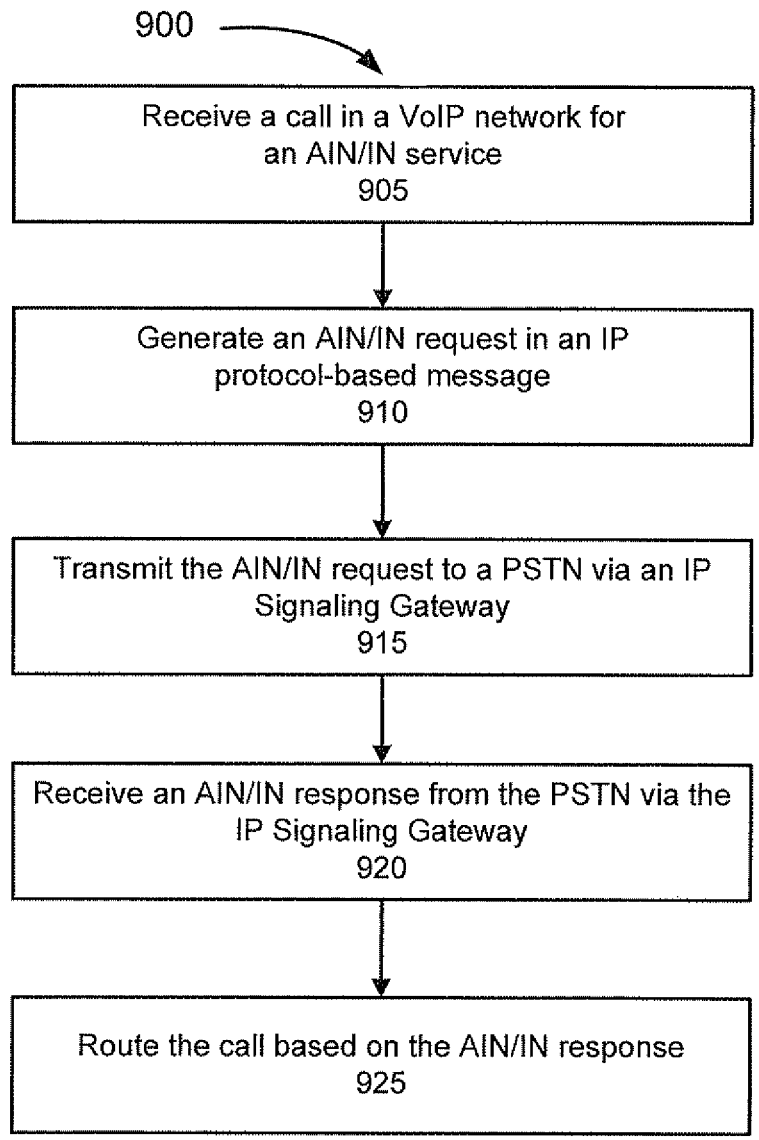
FIGS. 9 and 10 are flow diagrams illustrating exemplary processes associated with the concepts described herein.

FIG. 9 is a flow diagram illustrating an exemplary process 900 that may be associated with the concepts described herein. In addition to FIG. 9, process 900 will be described in reference to exemplary environment 200 illustrated in FIG. 2, as well as previously described call scenarios.

Process 900 may begin with receiving a call in a VoIP network for an AIN/IN service (block 905). For example, an endpoint in a VoIP network, such as terminal 105-1 of VoIP network 110, may place a call that is received by server 115-1. The call may require routing instructions from an AIN/IN service. The AIN/IN service may include, for example, N11 codes, 10-digit telephone numbers that provide a special service and/or toll free telephone numbers.

An AIN/IN request in an IP protocol-based message may be generated (block 910). For example, server 115-1 may generate an AIN/IN request that includes the data needed for an AIN/IN service decision to be favorably made in a PSTN, such as PSTN 125. The AIN/IN request may be generated in an IP protocol-based message capable of carrying a user-defined payload. For example, the IP protocol may be HTTP or SIP. The AIN/IN request may be included in a standard IP protocol payload, as in the SIP Invite/Redirect example.

The AIN/IN request may be transmitted to the PSTN via an IP signaling gateway (block 915). For example, server 115-1 may transmit the AIN/IN request to AIN SCP 130 of PSTN 125 via IP signaling gateway 120. Depending on AIN SCP 130 capabilities (e.g., protocols used), IP signaling gateway 120 may convert the AIN/IN request to a protocol that AIN SCP 130 understands.

An AIN/IN response from the PSTN may be received via the IP signaling gateway (block 920). For example, server 115-1 may receive an AIN/IN response from AIN SCP 130 via IP signaling gateway 120. Depending on AIN SCP 130 capabilities (e.g., protocols used), the AIN/IN response may be converted to an IP protocol-based message by IP signaling gateway 120. For example, the AIN/IN response may be converted to HTTP or SIP.

The call may be routed based on the AIN/IN response (block 925). For example, server 115-1 may route the call for terminal 105-1 to the destination endpoint based on the AIN/IN response. In instances where the destination is an endpoint of VoIP network 110 (e.g., terminal 105-3), server 115-1 may route the call within VoIP network 110 without utilizing resources belonging to PSTN 125 (e.g., as previously described and illustrated in connection with FIG. 5). In instances where the destination is an endpoint not of VoIP network 110 (e.g., terminal 105-4 of PSTN 125), server 115-1 may route the call in the most efficient manner. In some instances, the most efficient route may involve server 115-1 selecting a gateway that is closer to the destination endpoint instead of a gateway that is closer to a source endpoint, a SSP, and/or an AIN SCP. For example, as previously described and illustrated in connection with FIG. 8, server 115-1 may select, for example, MGW 210-2 to enter PSTN 125 since it is closer to terminal 105-4, rather than entering PSTN 125 utilizing MGW 210-1.

Although FIG. 9 illustrates an exemplary process 900, in other implementations, fewer, additional, or different processes may be performed.

Figure 10:
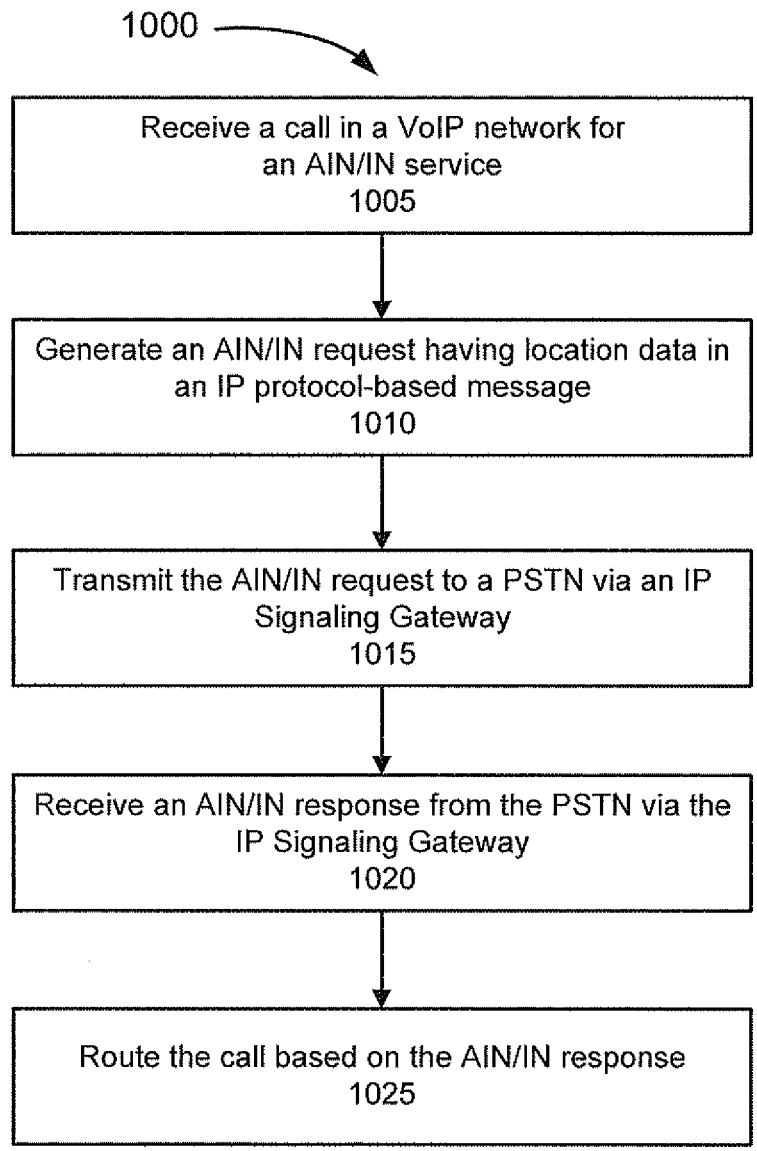

FIG. 10 is a flow diagram illustrating an exemplary process 1000 that may be associated with the concepts described herein. In addition to FIG. 10, process 1000 will be described in reference to exemplary environment 200 illustrated in FIG. 2, as well as previously described call scenarios.

Process 1000 may begin with receiving a call in a VoIP network for an AIN/IN service (block 1005). For example, an endpoint in a VoIP network, such as terminal 105-2 of VoIP network 110, may place a call that is received by server 115-1. The call may be for obtaining an AIN/IN service; however, the telephone number of terminal 105-2 does not permit access to the AIN/IN service. The AIN/IN service may include, for example, N11 codes, 10-digit telephone numbers that provide a special service and/or toll free telephone numbers.

An AIN/IN request having location data in an IP protocol-based message may be generated (block 1010). For example, server 115-1 may generate an AIN/IN request that includes the data needed for an AIN/IN service decision to be favorably made in a PSTN, such as PSTN 125. The AIN/IN request may include location data. The location data may include, for example, a zip code or a PLRN corresponding to a geographic area in which the AIN/IN service may be accessed, a signaling point code, a LATA, or some other type of location identifier. The AIN/IN request may be generated in an IP protocol-based message capable of carrying a user-defined payload. For example, the IP protocol may be HTTP or SIP.

The AIN/IN request may be transmitted to the PSTN via an IP signaling gateway (block 1015). For example, server 115-1 may transmit the AIN/IN request to AIN SCP 130 of PSTN 125 via IP signaling gateway 120. Depending on AIN SCP 130 capabilities (e.g., protocols used), IP signaling gateway 120 may convert the AIN/IN request to a protocol that AIN SCP 130 understands.

An AIN/IN response from the PSTN may be received via the IP signaling gateway (block 1020). For example, server 115-1 may receive an AIN/IN response from AIN SCP 130 via IP signaling gateway 120. Depending on AIN SCP 130 capabilities (e.g., protocols used), the AIN/IN response may be converted to an IP protocol-based message by IP signaling gateway 120. For example, the AIN/IN response may be converted to HTTP or SIP.

The call may be routed based on the AIN/IN response (block 1025). For example, server 115-1 may route the call for terminal 105-2 to the destination endpoint based on the AIN/IN response. In instances where the destination is an endpoint (e.g., terminal 105-3) of VoIP network 110, server 115-1 may route the call within VoIP network 110 without utilizing resources belonging to PSTN 125 (e.g., as previously described and illustrated in connection with FIG. 5). In instances where the destination is an endpoint not of VoIP network 110 (e.g., terminal 105-4 of PSTN 125), server 115-1 may route the call in the most efficient manner. In some instances, server 115-1 may select, for example, MGW 210-2 to enter PSTN 125 since it is closer to terminal 105-4, rather than entering PSTN 125 utilizing MGW 210-1 (e.g., as previously described and illustrated in connection with FIG. 8).

Although FIG. 10 illustrates an exemplary process 1000, in other implementations, fewer, additional, or different processes may be performed.

The foregoing description of implementations provides illustration, but is not intended to be exhaustive or to limit the implementations to the precise form disclosed. In this regard, the concepts described herein may have broader application.

In addition, while series of blocks have been described with regard to the processes illustrated in FIGS. 9 and 10, the order of the blocks may be modified in other implementations. Further, non-dependent blocks may be performed in parallel.

It will be apparent that the concepts described herein may be implemented in many different forms of software, firmware, and hardware in the implementations illustrated in the figures. The actual software code or specialized control hardware used to implement these concepts do not limit the invention. Thus, the operation and behavior of the exemplary environments were described without reference to the specific software code—it being understood that software and control hardware can be designed to implement these concepts based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method, comprising:
   receiving an Advanced Intelligent Network/Intelligent Network (AIN/IN) service request from a Voice over Internet Protocol (VoIP) subscriber device;
   generating an IP-based message for invoking the AIN/IN service, wherein the generating includes:
      determining whether a location data is to be added to the IP-based message based on a comparison between a telephone number pertaining to the VoIP subscriber device and a geographic location of the VoIP subscriber device; and
      adding the location data to the IP-based message in response to determining that a geographic location indicative of the telephone number does not match the geographic location of the VoIP subscriber device;
   routing the IP-based message to an AIN/IN service control device of a Public Switched Telephone Network (PSTN) via an IP signaling gateway;
   receiving an AIN/IN response from the AIN/IN service control device, wherein the AIN/IN response includes a routing number of a destination device that provides the AIN/IN service; and
   connecting the VoIP subscriber device to the AIN/IN service based on the AIN/IN response, wherein when the routing number of the destination device indicates a VoIP destination device, the VoIP subscriber device is connected to the AIN/IN service completely within a VoIP network.

2. The method of claim 1, wherein the AIN/IN service request includes at least one of a N11 code, a non-toll free ten digit telephone number, or a toll-free telephone number.

3. The method of claim 1, wherein the IP-based message includes one of a Session Initiation Protocol (SIP) AIN/IN service request message or a Hypertext Transfer Protocol (HTTP) AIN/IN service request message.

4. The method of claim 1, further comprising:
   determining whether to convert the routed IP-based message to a protocol that the AIN/IN service control device understands; and
   converting the routing IP-based message to the protocol that the AIN/IN service control device understands in response to determining that the AIN/IN service control device would not understand the IP-based message.

5. The method of claim 1, wherein the determining comprises:
   determining that the AIN/IN service request is invoking a geographic-dependent AIN/IN service.

6. The method of claim 5, wherein the geographic location indicative of the telephone number does not match a geographic location associated with the geographic-dependent AIN/IN service.

7. The method of claim 5, wherein the location data includes a dummy Zone Improvement Plan (ZIP) code corresponding to a locale of the geographic-dependent AIN/IN service.

8. The method of claim 7, wherein the location data includes a local access and transport area identifier or a signaling point code.

9. The method of claim 1, further comprising:
   omitting to add the location data to the IP-based message in response to determining that the geographic location indicative of the telephone number matches the geographic location of the VoIP subscriber device.

10. The method of claim 1, wherein when the AIN/IN service is provided by a Public Switched Telephone Network (PSTN) destination, the method further comprises:
    selecting a route to enter the PSTN based on a gateway closest to the PSTN destination; and, wherein the connecting comprises:
    connecting the VoIP subscriber device to the AIN/IN service based on the selected route.

11. A system comprising:
    a device comprising:
       a communication interface;
       a memory to store instructions; and
       a processor to execute the instructions to:
          receive, via the communication interface, a request, from a Voice over Internet Protocol (VoIP) user device, for invoking an Advanced Intelligent Network/Intelligent Network (AIN/IN) service;
          generate a first IP message that requests a destination number associated with the AIN/IN service in response to a receipt of the request, wherein a generation of the first IP message includes:
             determine whether a location data is to be added to the first IP message based on a comparison between a telephone number pertaining to the VoIP user device and a geographic location of the VoIP user device; and
             add the location data to the first IP message in response to a determination that a geographic location indicative of the telephone number does not match the geographic location of the VoIP user device;
          transmit, via the communication interface, the first IP message to an AIN/IN service control device of a Public Switched Telephone Network (PSTN) via an IP signaling gateway;
          receive, via the communication interface, a second IP message from the AIN/IN service control device via the IP signaling gateway, the second IP message including a destination number associated with the AIN/IN service; and
          connect the VoIP user device to the AIN/IN service based on the second IP message, wherein when the destination number indicates a VoIP destination device, the VoIP user device is connected to the AIN/IN service completely within a VoIP network.

12. The system of claim 11, wherein the first IP message includes one of a Session Initiation Protocol (SIP) SUBSCRIBE message or a Hypertext Transfer Protocol (HTTP) POST message.

13. The system of claim 11, wherein the processor to execute the instructions to:
    determine that the AIN/IN service request is for invoking a geographic-dependent AIN/IN service, and wherein the geographic location indicative of the telephone number does not match a geographic location associated with the geographic-dependent AIN/IN service.

14. The system of claim 11, wherein the location data includes one of a Zone Improvement Plan (ZIP) code, a physical location routing number, a local access and transport (LATA) identifier, or a signaling point code.

15. The system of claim 11,
    wherein when the AIN/IN service is provided by a Public Switched Telephone Network (PSTN) destination, the processor to execute the instructions to:
    select a route to enter the PSTN based on a gateway closest to the PSTN destination; and
    connect the VoIP user device to the AIN/IN service based on the selected route.

16. A non-transitory storage medium storing instructions executable by a device, wherein the instructions comprise instructions to:
- receive an Advanced Intelligent Network/Intelligent Network (AIN/IN) service request for an AIN/IN service from a Voice Over Internet Protocol (VoIP) user device;
- generate a first IP message, wherein a generation of the first IP message includes:
  - determine whether a location data is to be added to the first IP message based on a comparison between a telephone number pertaining to the VoIP user device and a geographic location of the VoIP user device; and
  - add the location data to the first IP message in response to a determination that a geographic location indicative of the telephone number does not match the geographic location of the VoIP user device;
- transmit the first IP message to an AIN/IN service control device of a Public Switched Telephone Network (PSTN) via an IP signaling gateway;
- receive a second IP message from the AIN/IN service control device via the IP signaling gateway, the second IP message including a destination number associated with the AIN/IN service; and
- connect the VoIP user device to the AIN/IN service based on the second IP message, wherein when the destination number indicates a VoIP destination device, the VoIP user device is connected to the AIN/IN service completely within a VoIP network.

17. The non-transitory storage medium of claim 16, wherein the instructions comprise instructions to:
- determine that the AIN/IN service request is invoking a geographic-dependent AIN/IN service.

18. The non-transitory storage medium of claim 17, wherein the geographic location indicative of the telephone number does not match a geographic location associated with the geographic-dependent AIN/IN service, and location data includes a dummy Zone Improvement Plan (ZIP) code corresponding to a locale of the geographic-dependent AIN/IN service.

19. The non-transitory storage medium of claim 16, wherein the IP-based message includes one of a Session Initiation Protocol (SIP) AIN/IN service request message or a Hypertext Transfer Protocol (HTTP) AIN/IN service request message.

20. The non-transitory storage medium of claim 16, wherein the AIN/IN service request includes at least one of a N11 code, a non-toll free ten digit telephone number, or a toll-free telephone number.

* * * * *